H. A. UNDERWOOD.
DOWEL.
APPLICATION FILED MAR. 16, 1910.
961,992.
Patented June 21, 1910.
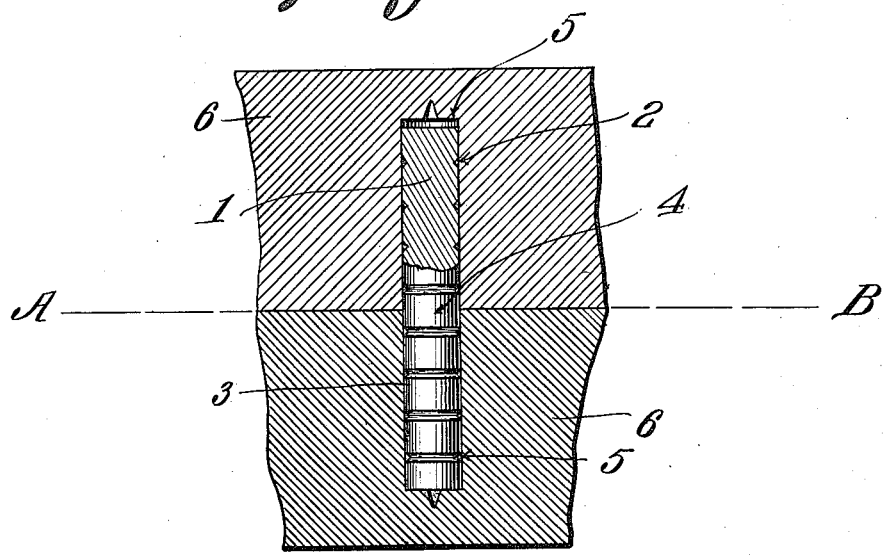
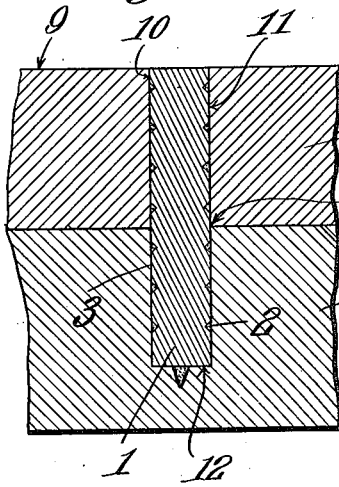
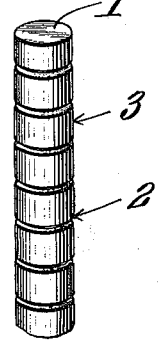
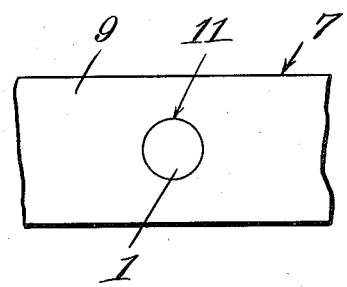
Horace A. Underwood,
Inventor
Witnesses
by C. A. Snow & Co.
Attorneys

UNITED STATES PATENT OFFICE.

HORACE A. UNDERWOOD, OF KEWANEE, ILLINOIS.

DOWEL.

961,992.  Specification of Letters Patent.  Patented June 21, 1910.

Application filed March 16, 1910. Serial No. 549,636.

*To all whom it may concern:*

Be it known that I, HORACE A. UNDERWOOD, a citizen of the United States, residing at Kewanee, in the county of Henry and State of Illinois, have invented a new and useful Dowel, of which the following is a specification.

It is the object of this invention to provide a dowel pin so constructed that it will be adapted to retain upon its exterior, a liberal supply of glue, when the dowel pin is thrust into the parts which it is the function of the pin to hold together; the dowel pin being so constructed, moreover, that it will be impossible for water to find its way into the opening in which the dowel pin is mounted; a contingency resulting in destroying the efficiency of the glue as a means for holding the dowel pin in place.

Dowel pins as heretofore constructed, have been provided with a sinuous channel for the reception of glue, the channel winding about the pin from end to end and crossing the end faces of pin. Moreover, in pins as thus constructed, it is impossible to pass a plane through the plug, at right angles to the axis thereof, without intersecting one of these glue holding channels. Consequently, when the dowel pin is mounted in place, with its outer end flush with the outer surface of the material in which the dowel pin is held, any water upon the surface of the substance in which the pin is mounted, will readily find its way downward, along one of these sinuous grooves, thus loosening and destroying the glue. Moreover, when two pieces of material are held together by a pin of the character referred to, any liquid finding its way between adjoining faces of the elements held together by the pin will, of a certainty, come into contact with one or more of these sinuous channels upon the pin, the moisture thus finding its way into the opening in which the pin is mounted, as certainly as though one of the end faces of the pin were exposed. These defects in channeled dowel pins, as at present constructed, it is the aim of this invention to overcome.

In the drawings, Figure 1 is a sectional elevation of a dowel pin constructed in accordance with my invention, the same having both of its ends inserted in two blocks, which it is the function of the dowel pin to hold together. Fig. 2 shows in perspective, the dowel pin of my invention. Fig. 3 is a section, showing another manner of mounting the dowel pin in place; and Fig. 4 is a top plan of the showing of Fig. 3.

In the drawings, the dowel pin is denoted by the numeral 1, and is preferably circular in cross section. The pin is provided with a series of annular, glue receiving grooves 2, extended around the pin in spaced planes normal to the axis of the pin, and defining in the pin, a series of circumscribing ribs 3.

The numeral 6 denotes a pair of abutting structural elements, which it is the function of the dowel pin to hold together. These structural elements have alined openings 5 for the reception of the dowel pin. When the dowel pin is mounted in place in these openings 5, it will be seen that one of the ribs upon the pin, denoted specifically by the numeral 4, is extended across the plane A—B, in which the abutting faces of the blocks 6 are located. Since there are no longitudinally extended grooves in the pin, this rib 4 will constitute a complete, and hermetic closure for the adjacent ends of the openings 5 in the blocks 6. Thus, any moisture, which may find its way between the blocks 6, in the plane A—B, will have no opportunity to find its way into the openings 5; and thus the glue or cement which is retained in the grooves 2 will be protected and kept intact. The application, and specific utility of the dowel pin is, however, better illustrated in Figs. 3 and 4 of the drawings. In the form thus shown, a pair of structural elements 7 and 8, are provided with alined openings 11 and 12 respectively, the opening 11 in the element 7 being extended entirely therethrough, while the opening 12 in the element 8 is extended but part way therethrough. When the dowel pin is mounted in these openings 11 and 12, the rib 4 will serve as an hermetic closure for the adjacent ends of the openings 11 and 12, while the uppermost rib 10 will serve as an hermetic closure for the upper end of the opening 11 in the block 7; the last mentioned feature being seen most clearly in Fig. 4.

In the construction shown in Figs. 3 and 4, one face 9 of one of the structural elements, is exposed directly to the weather, and it will be seen that the rib 10 will prevent any moisture upon the face 9 from finding its way within the opening in which the pin is mounted, the rib 4 serving, as in Fig. 1, to prevent any moisture from finding its way into the opening in which the pin is mounted, between the abutting faces of the elements 7 and 8.

It should be noted that the opening 12 in the block 8 is of sufficient depth to position the rib 4 properly to close the adjacent ends of the openings 11 and 12 and likewise to position the rib 10 so that it will extend across the outer face of the structural element 7, thus closing the outer end of the opening 11. The same observation holds true with respect to the opening 5 in the block 6 of Fig. 1.

From the foregoing it will be seen that I have provided a dowel pin so constructed that it will retain within its contour, sufficient glue to hold itself in place, the dowel pin being constructed, moreover, in such a way that no moisture can find its way into those recesses in the pin in which the cement or glue is retained.

Having thus described the invention what is claimed is:

1. A dowel pin having annular cement receiving grooves extended around the pin in spaced planes normal to the axis of the pin and defining in the pin a series of circumscribing ribs, that rib which is located at the end of the opening in which the pin is mounted, constituting an hermetic closure for said opening, thereby to prevent moisture from finding its way into the cement receiving grooves of the pin.

2. The combination with abutting structural elements, provided with alined openings for the reception of a dowel pin, of a dowel pin mounted in said openings, and having annular cement receiving grooves extended around the pin in spaced planes normal to the axis of the pin and defining in the pin, circumscribing ribs, one of said openings being of sufficient depth to position one of the ribs in the pin to extend across the plane of the abutting faces of the structural elements to form an hermetic closure for the adjacent ends of said openings.

3. The combination with abutting structural elements, one of which has an opening extended part way therethrough, the other of which has an opening extended entirely therethrough, of a dowel pin mounted in said openings, and having annular, cement receiving grooves extended around the pin in spaced planes normal to the axis of the pin and defining in the pin, circumscribing ribs, the first named opening being of sufficient depth to position one of said ribs to extend across the plane of the abutting faces of the structural elements, to form an hermetic closure for the adjacent ends of the said openings, and to position another of said ribs to extend across the outer face of the second named structural element to form an hermetic closure for the outer end of the opening in said element.

In testimony that I claim the foregoing as my own, I have hereto affixed my signature in the presence of two witnesses.

HORACE A. UNDERWOOD.

Witnesses:
Wm. H. Scott,
Frank Heeter.